United States Patent
Noda et al.

(10) Patent No.: US 11,749,258 B2
(45) Date of Patent: *Sep. 5, 2023

(54) DEVICE AND METHOD FOR SUPPORTING CREATION OF RECEPTION HISTORY, NON-TRANSITORY COMPUTER READABLE RECORDING MEDIUM

(71) Applicant: NIPPON TELEGRAPH AND TELEPHONE CORPORATION, Tokyo (JP)

(72) Inventors: Yoshiaki Noda, Tokyo (JP); Setsuo Yamada, Tokyo (JP); Takaaki Hasegawa, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/949,307

(22) Filed: Sep. 21, 2022

(65) Prior Publication Data

US 2023/0014267 A1   Jan. 19, 2023

Related U.S. Application Data

(63) Continuation of application No. 17/268,470, filed as application No. PCT/JP2019/031931 on Aug. 14, 2019, now Pat. No. 11,482,209.

(30) Foreign Application Priority Data

Aug. 15, 2018 (JP) .................................. 2018-152899

(51) Int. Cl.
G06Q 10/04 (2023.01)
G10L 15/02 (2006.01)
(Continued)

(52) U.S. Cl.
CPC .............. *G10L 15/02* (2013.01); *G10L 15/14* (2013.01); *H04M 3/42221* (2013.01); *H04M 3/5175* (2013.01); *H04M 2201/40* (2013.01)

(58) Field of Classification Search
CPC .......... H04M 3/42221; H04M 3/5175; H04M 2201/40; G10L 15/02; G10L 15/14; G10L 15/26
(Continued)

(56) References Cited

U.S. PATENT DOCUMENTS

2009/0048832 A1   2/2009   Terao
2015/0195221 A1   7/2015   Rasmussen
(Continued)

FOREIGN PATENT DOCUMENTS

JP   2017085411 A   5/2017
JP   2017125921 A   7/2017
(Continued)

OTHER PUBLICATIONS

Kawamura et al. (2016) "Utilization of Artificial Intelligence in Call Centers," NTT Technical Review 14:5, 4 pages.
(Continued)

*Primary Examiner* — Md S Elahee

(57) ABSTRACT

A display device for displaying an utterance and information extracted from the utterance, includes an input/output interface configured to display display blocks for a series of dialogue scenes in chronological order of acquisition of utterances, each of the series of dialogue scenes being indicated by dialogue scene data stored in correspondence with utterance data indicating a corresponding one of the utterances, display dialogue scene information within each of the display blocks for the series of dialogue scenes, the dialogue scene information including the corresponding one of the utterances, an utterance type indicating a type of the
(Continued)

corresponding one of the utterances, or utterance focus point information of the corresponding one of the utterances, and switch, based on an operation input, between displaying the dialogue scene information and not displaying the dialogue scene information within each of the display blocks for the series of dialogue scenes.

6 Claims, 16 Drawing Sheets

(51) Int. Cl.
  *G10L 15/14* (2006.01)
  *H04M 3/42* (2006.01)
  *H04M 3/51* (2006.01)
(58) Field of Classification Search
  USPC .......................................................... 704/251
  See application file for complete search history.

(56) References Cited

U.S. PATENT DOCUMENTS

2017/0336926 A1 11/2017 Chaudhri
2019/0325897 A1 10/2019 Liu

FOREIGN PATENT DOCUMENTS

JP   2018124432 A  *  8/2018
WO   2007055233 A1    5/2007

OTHER PUBLICATIONS

U.S. Appl. No. 17/268,470, Non-Final Rejection dated Jan. 6, 2022, 12 pages.
U.S. Appl. No. 17/268,470, Notice of Allowance dated Jun. 28, 2022, 7 pages.

* cited by examiner

FIG. 2

| | CUSTOMER | SERVICE PERSON |
|---|---|---|
| #11 | | THANK YOU FOR WAITING. THIS IS ○○ CALL CENTER, I AM ○○, IN CHARGE. |
| #12 | WELL, | |
| #13 | I HAVE CAR INSURANCE WITH YOU, AND I WOULD LIKE TO ASK ABOUT THAT CAR INSURANCE. | |
| #14 | | IS IT AN INQUIRY ABOUT YOUR CAR INSURANCE? |
| #15 | YES, THAT IS RIGHT. | |
| #16 | UM, MY SON GOT A DRIVER'S LICENSE THE OTHER DAY. | |
| #17 | | YES |
| #18 | I WOULD LIKE TO CHANGE MY CAR INSURANCE POLICY SO THAT EVEN IF MY SON DRIVES, HE WILL BE COVERED BY THE CAR INSURANCE. | |
| #19 | | TO CONFIRM, YOU WOULD LIKE YOUR NEWLY LICENSED SON TO BE COVERED BY YOUR CAR INSURANCE? |
| #20 | YES, THAT IS RIGHT. | |
| #21 | | I WILL CHECK THE STATUS OF THE CONTRACT, SO COULD YOU PLEASE TELL ME THE NAME OF THE POLICY HOLDER? |
| #22 | THE POLICY HOLDER IS ○○□□. | |
| #23 | | TO CONFIRM, THAT IS MR. (OR MRS.) ○○□□. PLEASE TELL ME YOUR REGISTERED ADDRESS AND PHONE NUMBER TO VERIFY YOUR IDENTITY. |
| #24 | THE ADDRESS IS... AND THE PHONE NUMBER IS..... | |
| #25 | | THANK YOU VERY MUCH. I HAVE CONFIRMED YOUR IDENTITY. |
| #26 | | ACCORDING TO MY CONFIRMATION, THE CURRENT CONTRACT DOES NOT COVER FAMILY MEMBERS UNDER THE AGE OF 35. |
| #27 | THAT IS RIGHT. | |
| #28 | HOW CAN MY SON ALSO BE COVERED BY THE INSURANCE? | |
| #29 | | YOU CAN CHANGE IT ON THIS PHONE CALL. YOUR MONTHLY INSURANCE PREMIUM WILL INCREASE BY ABOUT 4000 YEN TO 8320 YEN. IS IT OK? |
| #30 | IT IS EXPENSIVE. | |
| #31 | BUT IT CANNOT BE HELPED. SO, PLEASE CHANGE IT. | |
| #32 | | THE CHANGE HAS BEEN ACCEPTED. |
| #33 | | THANK YOU FOR CALLING US TODAY. |

FIG. 3

SPEECH RECOGNITION UNIT UTTERANCES

- YES, THAT IS RIGHT.
- UM,
- THE OTHER DAY,
- MY SON GOT A DRIVER'S LICENSE,
- EVEN IF MY SON DRIVES,
- I WOULD LIKE TO CHANGE MY CAR INSURANCE POLICY SO THAT HE WILL BE COVERED BY THE CAR INSURANCE.

- THANK YOU VERY MUCH. I HAVE CONFIRMED YOUR IDENTITY. ACCORDING TO MY CONFIRMATION, THE CURRENT CONTRACT DOES NOT COVER FAMILY MEMBERS UNDER THE AGE OF 35. AND IF YOUR SON IS INVOLVED IN AN ACCIDENT, THE PREMIUM WILL NOT BE PAID. WOULD YOU LIKE TO CHANGE THE AGE LIMIT?

END-OF-TALK UNIT UTTERANCES

- YES, THAT IS RIGHT.
- UM, MY SON GOT A DRIVER'S LICENSE THE OTHER DAY, SO I WOULD LIKE TO CHANGE MY CAR INSURANCE POLICY SO THAT EVEN IF MY SON DRIVES, HE WILL BE COVERED BY THE CAR INSURANCE.

- THANK YOU VERY MUCH.
- I HAVE CONFIRMED YOUR IDENTITY.
- ACCORDING TO MY CONFIRMATION, THE CURRENT CONTRACT DOES NOT COVER FAMILY MEMBERS UNDER THE AGE OF 35.
- IF YOUR SON IS INVOLVED IN AN ACCIDENT, THE PREMIUM WILL NOT BE PAID. WOULD YOU LIKE TO CHANGE THE AGE LIMIT?

FIG. 6

| SPEECH RECOGNITION UNIT UTTERANCE DATA | UTTERANCE CHANNEL | VOICE RECOGNITION UTTERANCE ID | END-OF-TALK UNIT ID | DIALOGUE SCENE DATA | UTTERANCE TYPE | UTTERANCE FOCUS POINT INFORMATION |
|---|---|---|---|---|---|---|
| WELL, | CUSTOMER | 1 | 1 | | | |
| I HAVE CAR INSURANCE WITH YOU, AND I WOULD LIKE TO ASK ABOUT THAT CAR INSURANCE. | CUSTOMER | 2 | 1 | INQUIRY UNDERSTANDING | SUBJECT UTTERANCE | CAR INSURANCE |
| IS IT AN INQUIRY ABOUT YOUR CAR INSURANCE? | OPERATOR | 3 | 2 | INQUIRY UNDERSTANDING | | CAR INSURANCE |
| YES, THAT IS RIGHT. | CUSTOMER | 4 | 3 | INQUIRY UNDERSTANDING | | |
| UM, MY SON GOT A DRIVER'S LICENSE THE OTHER DAY. | CUSTOMER | 5 | 4 | | | |
| YES | OPERATOR | 6 | 5 | INQUIRY UNDERSTANDING | | |
| I WOULD LIKE TO CHANGE MY CAR INSURANCE POLICY SO THAT EVEN IF MY SON DRIVES, HE WILL BE COVERED BY THE CAR INSURANCE. | CUSTOMER | 7 | 4 | INQUIRY UNDERSTANDING | REGARD UTTERANCE | WOULD LIKE TO CHANGE |
| TO CONFIRM, YOU WOULD LIKE YOUR NEWLY LICENSED SON TO BE COVERED BY YOUR CAR INSURANCE? | OPERATOR | 8 | 6 | INQUIRY UNDERSTANDING | REGARD CONFIRMATION UTTERANCE | CHANGE RESPONSE |
| YES, THAT IS RIGHT. | CUSTOMER | 9 | 7 | INQUIRY UNDERSTANDING | | |
| I WILL CHECK THE STATUS OF THE CONTRACT, SO COULD YOU PLEASE TELL ME THE NAME OF THE POLICY HOLDER? | OPERATOR | 10 | 8 | CONTRACT CONFIRMATION | | |
| ... | | | | | | |

FIG. 13

| ⊞ CONTRACT CONFIRMATION ▶ | ADD FOCUS POINT |
| ⊞ NAME: SUZUKI ICHIRO ☒ |
| ⊞ ADDRESS: x x x x x x x x x x x x x x x x x x x ☒ |
| ⊞ CONTACT INFORMATION: 090-1234-5678 ☒ |

⊞ RESPONSE ▶    ADD FOCUS POINT

⊟ RESPONSE: x x x x x x x x x x x x x x x x ☒
x x x x x x x x x x x x x x x x x x x x

| | | |
|---|---|---|
| ⊞ | OPENING | ADD FOCUS POINT |
| ⊞ | INJURY ACQUISITION | ADD FOCUS POINT |
| | ⊞ INJURY PRESENCE: × × | ☒ |
| ⊞ | ACCIDENT SITUATION ACQUISITION | ADD FOCUS POINT |
| ⊞ | DRINKING CONFIRMATION | ADD FOCUS POINT |
| | ⊞ DRINKING PRESENCE: × × | ☒ |
| ⊞ | REPAIR SITUATION CONFIRMATION | ADD FOCUS POINT |
| | ⊞ REPAIR PRESENCE: × × | ☒ |
| | ⊞ REPAIR SHOP: × × × × × × × × × × | ☒ |
| ⊞ | INSURANCE PREMIUM INCREASE CONFIRMATION | ADD FOCUS POINT |
| ⊞ | CLOSING | ADD FOCUS POINT |

DEVICE AND METHOD FOR SUPPORTING CREATION OF RECEPTION HISTORY, NON-TRANSITORY COMPUTER READABLE RECORDING MEDIUM

CROSS-REFERENCE TO RELATED APPLICATION

This application is a Continuation application of U.S. patent application Ser. No. 17/268,470, filed on Feb. 14, 2021, which is the U.S. National Phase of International Application No. PCT/JP2019/031931 filed on Aug. 14, 2019, which claims priority to and the benefit of Japanese Patent Application No. 2018-152899 filed on Aug. 15, 2018, the entire contents of which are incorporated herein by reference.

TECHNICAL FIELD

The present disclosure relates to a device for supporting creation of dialogue history, a method for supporting creation of dialogue history, a data structure, a program, a display device, and an editing support device that support the creation of a dialogue history.

BACKGROUND

Conventionally, a service person (a call center operator, a receptionist at a counter, etc.) creates a dialogue history by browsing textualized utterances, obtained by performing speech recognition processing on the voices uttered respectively by a customer and the service person at the time of the dialogue, and posting some of the utterances after the dialogue. Further, a method of extracting utterances that indicate the customer's regard from a plurality of utterances at the time of the dialogue (regard utterances) and utterances that the service person repeats to confirm the regard (regard confirmation utterances), and presenting the extracted regard utterances and the regard confirmation utterances, is known.

Non-Patent Literature 1 (NPL 1) discloses extracting or classifying words or utterances that characterize the content of a dialogue as focus points, from all utterances in a dialogue between a customer and a service person in a call center.

CITATION LIST

Non-Patent Literature

NPL 1: Seiji Kawamura, four others, "Utilization of AI at Call Centers", NTT Technology Journal, February 2016, pp. 35-37.

SUMMARY

However, as before, when creating a dialogue history using textualized utterances obtained by performing speech recognition processing on voice, the service person refers to a large amount of textualized utterances corresponding to all the utterances at the time of the dialogue. As a result, it takes a lot of time for the service person to create the dialogue history.

Further, when the dialogue history is created by using regard utterances that indicate the regard and regard confirmation utterances that indicate the regard to be confirmed from among the utterances in the dialogue, the automatic generation may not be able to create a sufficiently appropriate dialogue history because the automatic generation can only present the parts of all the utterances generated in the dialogue that are related to the regard. Further, when there was an error in the extraction of the regard utterances or the regard confirmation utterances, the presented utterances alone may not be able to properly cover the focus points as a summary.

The objective of the present disclosure, conceived in view of above-mentioned problems, is to provide a display device or an editing support device that can efficiently create an appropriate dialogue history.

In order to solve the above-mentioned problems, a display device for displaying an utterance and information extracted from the utterance according to the present disclosure comprises an input/output interface configured to:

display display blocks for a series of dialogue scenes in chronological order of acquisition of utterances, each of the series of dialogue scenes being indicated by dialogue scene data stored in correspondence with utterance data indicating a corresponding one of the utterances;

display dialogue scene information within each of the display blocks for the series of dialogue scenes, the dialogue scene information including the corresponding one of the utterances, an utterance type indicating a type of the corresponding one of the utterances, or utterance focus point information of the corresponding one of the utterances; and switch, based on an operation input, between displaying the dialogue scene information and not displaying the dialogue scene information within each of the display blocks for the series of dialogue scenes.

Further, in order to resolve the above-mentioned problems, an editing support device according to the present disclosure comprises the above display device, and a dialogue utterance focus point information store configured to, with respect to an utterance corresponding to a dialogue scene, enable one or more of:

an operation to modify, delete, or add the dialogue scene of the utterance;

an operation to modify, delete, or add an utterance type of the utterance; and an operation to modify, delete, or add utterance focus point information corresponding to the utterance type.

According to the display device or the editing support device according to the present disclosure, appropriate dialogue histories can be efficiently created.

BRIEF DESCRIPTION OF THE DRAWINGS

In the accompanying drawings:

FIG. 2 is a diagram showing an example of utterances by a customer and a service person.

FIG. 3 is a diagram showing utterances of a speech recognition unit and utterances of an end-of-talk unit.

FIG. 6 is a diagram showing an example of information stored in the dialogue utterance focus point information store.

FIG. 13 is a diagram showing a seventh example of information displayed by the input/output interface in the dialogue utterance browser.

FIG. 16 is a diagram showing an example of information displayed by the input/output interface in the dialogue utterance browser in the modified example.

DETAILED DESCRIPTION

Hereinafter, embodiments for carrying out the present disclosure will be described with reference to the drawings.

Figure 1:
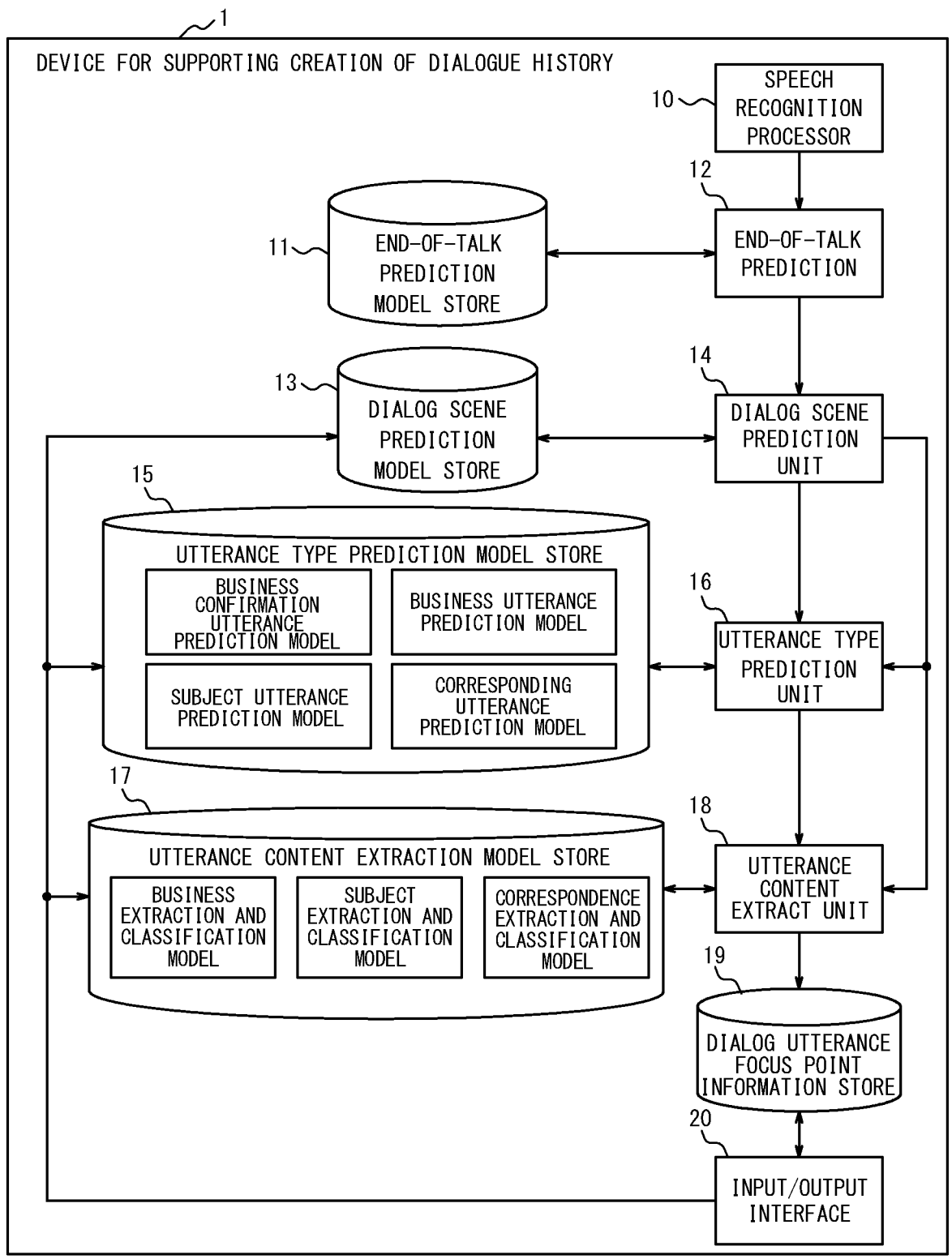
FIG. 1 is a functional block diagram showing an example configuration of the device for supporting creation of dialogue history according to an embodiment of the present disclosure.

FIG. 1 is a functional block diagram showing an example configuration of a device for supporting creation of dialogue history 1 according to an embodiment of the present disclosure. The device for supporting creation of dialogue history 1 according to the present embodiment supports creation of dialogue histories based on, for example, utterances between a customer and a service person in a call center. The device for supporting creation of dialogue history 1 is also a display device for displaying the dialogue history. The device for supporting creation of dialogue history 1 is also an editing support device for editing the dialogue history.

The device for supporting creation of dialogue history 1 shown in FIG. 1 comprises a speech recognition processor 10, an end-of-talk prediction model store 11, an end-of-talk predict unit 12, an dialogue scene prediction model store 13, a dialogue scene predict unit 14, an utterance type prediction model store 15, an utterance type predict unit 16, an utterance content extraction model store 17, an utterance content extract unit 18, a dialogue utterance focus point information store 19, and an input/output interface 20.

The speech recognition processor 10 acquires utterances made by voice and converts the utterances made by the voice into textualized utterance data by performing speech recognition. Specifically, the speech recognition processor 10, by detecting silent intervals of a predetermined time or longer in the utterances made by the voice, acquires a speech recognition result regarding the voice of a voiced point between silent intervals as utterances of a speech recognition unit. Here, utterances of the customer and utterances of the service person, made by voice, are input in different utterance channels (2 channels), and the speech recognition processor 10 distinguishes between the utterances of the customer and the utterances of the service person to perform speech recognition.

As described above, in the speech recognition, when the silent interval continues for the predetermined time or longer, after the final utterance of the previous speech recognition processing unit, the speech recognition is performed on the utterances up to the silent interval as one processing unit, and the speech recognition result is output as such a processing unit. Further, in the speech recognition, when the silent interval continues for a predetermined time that is shorter than the silent interval set for predicting the processing unit described above, in the speech recognition result, a punctuation mark is added at a position corresponding to the silent interval. It should be noted that whether a period is added, or a comma is added, is appropriately selected from, for example, the context before and after. For example, literature published in 2013 ("Automatic Insertion Based on Multiple Annotations of Reading Points for Speech", 1882-7765, No. 54, Vol. 2) discloses an automated insertion method for insertion of punctuation marks into speech recognition results. Specifically, a method for inserting the punctuation marks based on features such as words (appearance form), parts of speech, segment boundaries, dependency information for the segment immediately after, and pose, is disclosed.

In many dialogues in call centers, the customer and the service person exchange utterances with each other. FIG. 2 is a diagram showing an example of utterances between the customer and the service person. In the embodiment shown in FIG. 2, the speech recognition processor 10 acquires the utterances #11, 14, 17, 19, 21, 23, 25, 26, 29, 32, 33 as the utterances by the service person. The speech recognition processor 10 acquires the utterances #12, 13, 15, 16, 18, 20, 22, 24, 27, 28, 30, and 31 as the utterances by the customer.

For utterances in which textualized strings of the utterance in the dialogue correspond to divided strings divided by punctuation marks, and utterances corresponding to strings in which consecutive divided strings are connected in the order of utterances, the end-of-talk prediction model store 11 stores an end-of-talk prediction model generated by learning of learning data, to which information (a supervision signal) indicating whether utterances in the dialogue are end-of-talk utterances is added.

The end-of-talk predict unit 12 predicts whether each utterance of the customer and the service person has reached the end of the speech; that is, whether the speakers have made cohesive utterances and spoken everything he or she wants to speak. Specifically, the end-of-talk predict unit 12 predicts whether an utterance is a speech termination utterance, by using the speech termination prediction model, for utterances corresponding to the divided character strings in which the character strings indicating the textualized utterance are divided by punctuation marks, that are included in the utterance data of the speech recognition unit converted by the speech recognition processor 10, and utterances corresponding to the character string connecting consecutive divided character strings in the order of utterances. Then, the end-of-talk predict unit 12 acquires the utterances of the speech termination unit as one unit that covers from speech initiation to speech termination of the speaker. The end-of-talk predict unit 12, when acquiring the utterances of the speech termination unit, outputs the utterance data and the utterance data accumulated up to that point to the dialogue scene predict unit 14 in the order of utterances.

Thus, even when an utterance is finely subdivided by the speech recognition processor 10 or an utterance that includes a lot of content without including a silent interval is uttered, the end-of-talk predict unit 12 divides an utterance of the intermittent speech recognition result and an utterance that is too long and includes a plurality of contents into cohesive units that the speaker wants to speak. For example, as shown in FIG. 3, when the end-of-talk predict unit 12 acquires utterances of a speech recognition unit that is less than the length required to extract unit classify utterance focus point information, such as: "Um,"; "the other day,"; "my son got a driver's license,"; "even if my son drives,"; and "I would like to change my car insurance policy so that his driving will be covered by the car insurance", the end-of-talk predict unit 12 acquires the above utterances as the utterances of the end-of-talk unit, "Um, my son got a driver's license the other day, so I would like to change my car insurance policy so that even if my son drives, his driving will be covered by the car insurance.".

Further, when the end-of-talk predict unit 12 acquires utterances of a speech recognition unit that exceeds the appropriate length for extracting or classifying the utterance focus point information, such as "Thank you very much. I have confirmed your identity. According to my confirmation, the current contract does not cover family members under the age of 35. And if your son is involved in an accident, the premium will not be paid. Would you like to change the age limit?", the end-of-talk predict unit 12 acquires the above utterances as the utterances of the end-of-talk unit of: "Thank you very much."; "I have confirmed your identity."; "According to my confirmation, the current contract does not cover family members under the age of 35."; "And if your son is involved in an accident, the premium will not be paid. Would you like to change the age limit?"

As described above, because in many cases the customer and the service person repeatedly perform their own utterances in dialogue to the utterances of the other, the end-of-talk predict unit 12 acquires utterances of a plurality of end-of-talk units in one dialogue.

The dialogue scene prediction model store 13 stores the dialogue scene prediction model generated by learning the correspondence between utterances and dialogue scenes. The dialogue scenes are scenes in a dialogue that include, for example: "opening" such as a first greeting; "inquiry understanding" to acquire inquiry contents; "contract confirmation" to confirm that the customer is a party to the contract and the contract contents; "response" to answer and respond to the customer about the acquired content; and "closing" such as a final greeting. For learning, for example, support vector machines (SVMs) or deep neural nets (DNNs) can be used.

When the end-of-talk predict unit 12 acquires the utterance of an end-of-talk unit, the dialogue scene predict unit 14 predicts the dialogue scene of the utterance based on the dialogue scene prediction model.

Figure 4:
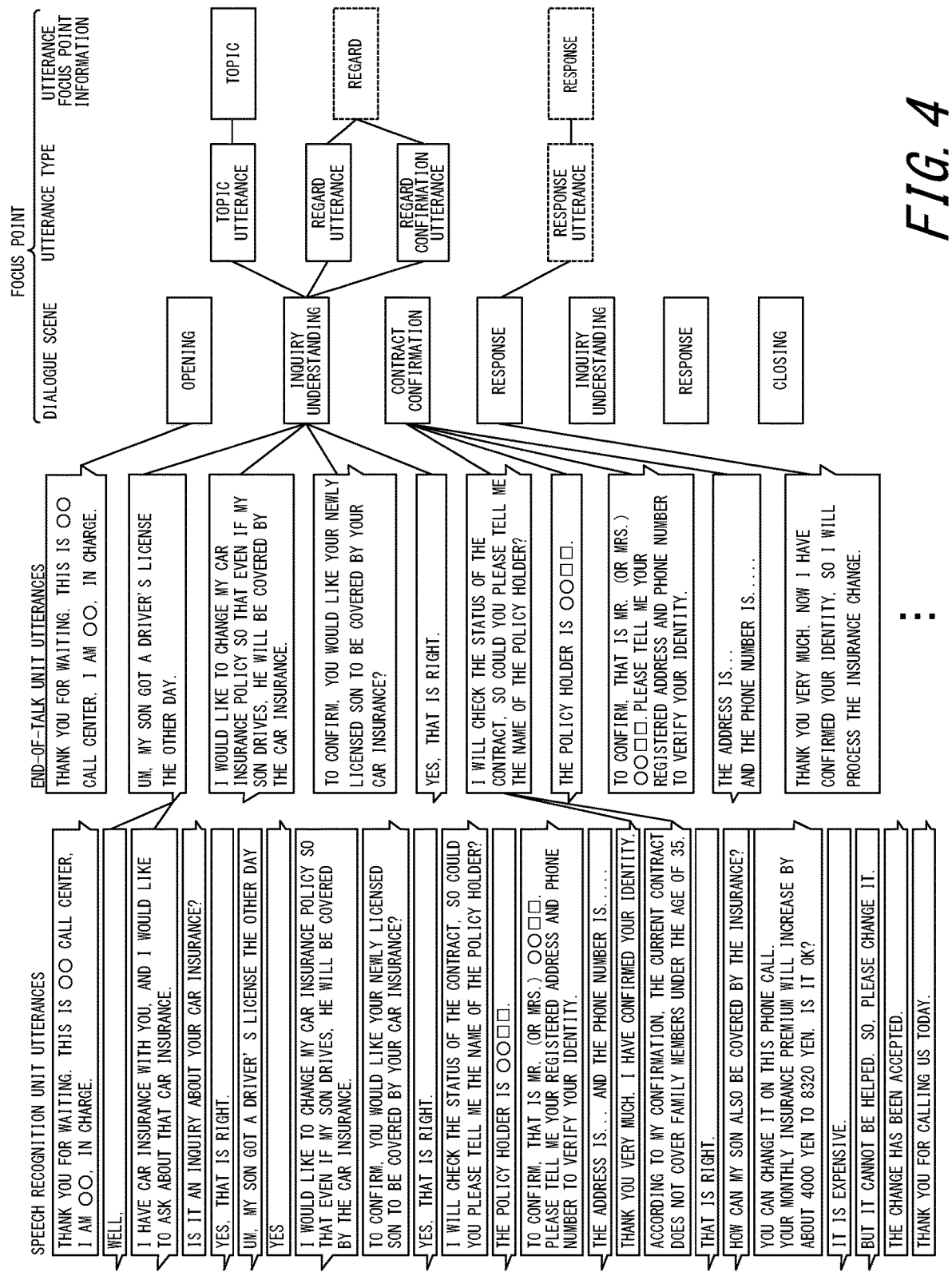
FIG. 4 is a diagram showing correspondence between utterances of the speech recognition unit, utterances of the end-of-talk unit, dialogue scenes, utterance types, and utterance focus point information.

In the example shown in FIG. 4, the dialogue scene predict unit 14 predicts that the dialogue scene of the utterance "Thank you for waiting. This is ◯ ◯ Call center, I am ◯ ◯, in charge." is an "opening". The dialogue scene of the utterance "Um, my son got a driver's license the other day" is predicted to be "inquiry understanding".

The utterance type prediction model store 15 stores the utterance type prediction model generated by learning the correspondence between the contents of the utterance and an utterance type that is the type of the utterance. The utterance type prediction model includes, for example, a regard utterance prediction model, a regard confirmation utterance prediction model, a topic utterance prediction model, a corresponding utterance prediction model and the like. The utterance type prediction model store 15 may store predetermined rules indicating the correspondence between the utterances and the utterance types.

The utterance type predict unit 16 predicts the utterance type of an utterance by utilizing the predicted result of the dialogue scene. Specifically, the utterance type predict unit 16 predicts the utterance type based on each model included in the utterance type prediction model for each of the end-of-talk unit. The utterance type predict unit 16 may predict the utterance type by using the rules stored in the utterance type prediction model store 15.

As shown in FIG. 4, for example, when the dialogue scene of an utterance of a certain end-of-talk unit is "inquiry understanding", the utterance type predict unit 16 predicts whether the utterance type of the utterance is "topic utterance" by using the topic utterance prediction model, predicts whether the utterance type is "regard utterance" by using the regard utterance prediction model, and predicts whether the utterance type is "regard confirmation utterance" by using the regard confirmation utterance prediction model. A "topic utterance" is an utterance that includes information about the topic to being talked about. "Regard utterance" is an utterance indicating a regard in a dialogue, and is an utterance uttered by a customer in a dialogue between a customer and a service person. A "regard confirmation utterance" is an utterance indicating confirmation of a regard in a dialogue, and is an utterance uttered by a service person in a dialogue between a customer and the service person.

For example, when the dialogue scene is "response", the utterance type predict unit 16 predicts whether the utterance type is "corresponding utterance" by using the corresponding utterance prediction model. A "responding utterance" is an utterance indicating the correspondence of the service person to the regard. The utterance type predict unit 16 may not predict the utterance type of utterance of a predetermined dialogue scene in accordance with a predetermined setting. For example, when the dialogue scene is "response", the utterance type predict unit 16 may not predict the utterance type. Therefore, in FIG. 4, the "responding utterance" in the utterance type is not surrounded by a solid line block and is instead surrounded by a broken line block.

For example, when the dialogue scene is "opening", "contract confirmation", or "closing", the utterance type predict unit 16 does not predict the utterance type.

The utterance content extraction model store 17 stores the utterance content extraction model generated by learning the correspondence between the utterances and the utterance focus point information. The utterance content extraction model includes, for example, a regard extraction and classification model, a topic extraction and classification model, and a response extraction and classification model. The utterance content extraction model store 22 may store predetermined rules indicating the correspondence between the utterances and the utterance focus point information.

As shown in FIG. 4, the utterance content extract unit 18 extracts or classifies utterance focus point information from the utterance based on the utterance type predicted by the utterance type predict unit 16. "To extract utterance focus point information" is to extract, from the utterance, utterance focus point information indicating the main content of the utterance. "To classify the utterance focus point information" is to classify, from the utterance, the utterance into any one of several pre-classified utterance focus point information indicating the main content of the utterance. The utterance content extract unit 18 may extract unit classify the utterance focus point information by using the rule stored in the utterance content extraction model store 22.

When the utterance type is "topic utterance", the utterance content extract unit 18 extracts or classifies, from the utterance, the "topic" as the utterance focus point information by using the topic extraction and classification model. When the utterance type is "regard utterance" or "regard confirmation utterance", the utterance content extract unit 18 extracts or classifies, from the utterance, "regard" as the utterance focus point information by using the regard extraction and classification model. When the utterance type is "responding utterance", the utterance content extract unit 18 extracts or classifies, from the utterance, the "response" as the utterance focus point information by using the response extraction and classification model.

As described above, when the utterance type predict unit 16 does not predict the utterance type, the utterance content extract unit 18 does not narrow down the utterance by the utterance type prediction in order to extract and classify the utterance focus point information. In the example shown in FIG. 4, the utterance type predict unit 16 does not need to predict the utterance type of the utterances for which the dialogue scene is "response". In this case, the utterance content extract unit 18 extracts or classifies the utterance focus point information from all utterances included in the block for which the dialogue scene is "response".

Further, the utterance content extract unit 18 may extract unit classify all of the utterances predicted to be the predetermined utterance type as the utterance focus point information. In the example shown in FIG. 4, the utterance content extract unit 18 extracts or classifies all of the utterances that are predicted to be "regard utterances" or "regard confirmation utterances" as the utterance focus point information. Therefore, in FIG. 4, "regard" in the utterance focus point information is not surrounded by the solid line block and is instead surrounded by a broken line block.

Figure 5:
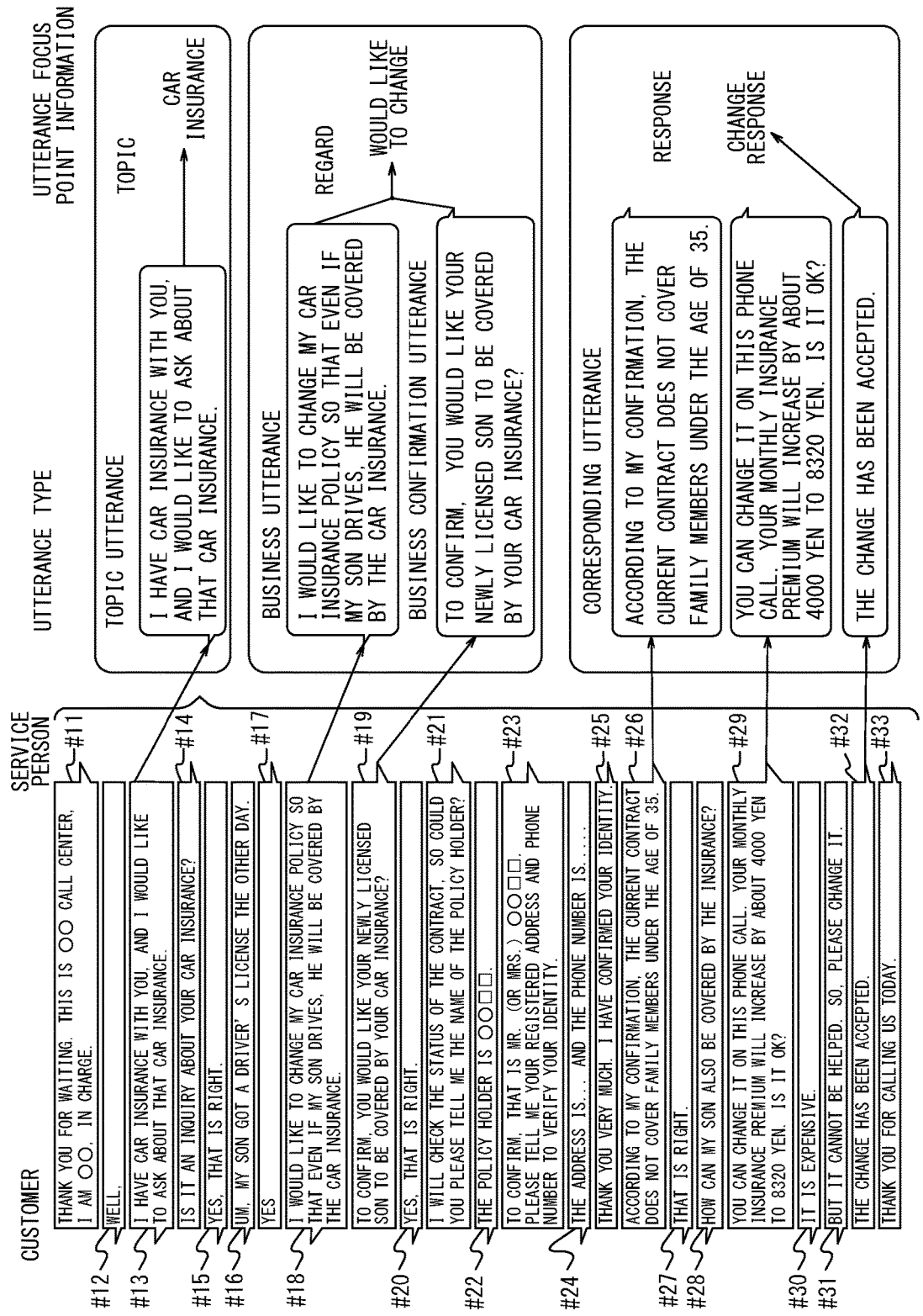
FIG. 5 is a diagram showing an example of utterance types and utterance focus point information corresponding to utterances of the end-of-talk units.

In the example shown in FIG. 5, the utterance "I have car insurance with you, and I would like to ask about that car insurance." is predicted to be a topic utterance. In this case, the utterance content extract unit 18 uses the topic utterance content extraction model to extract unit classify "car insurance" as the "topic" that is the utterance focus point information from the utterance.

Further, the utterance "I would like to change my car insurance policy so that even if he drives, his driving will be covered by the car insurance." is predicted to be a "regard utterance", and the utterance "To confirm, you would like your newly licensed son to be covered by your car insurance?" is predicted to be a "regard confirmation utterance". In this case, the utterance content extract unit 18 uses the regard utterance content extraction model to extract unit classify "would like to change" from these utterances as "regard" that is the utterance focus point information.

Further, the utterances "According to my confirmation, the current contract does not cover family members under the age of 35.", "You can change it on this phone call. Your monthly insurance premium will increase by about 4000 yen to 8320 yen. Is it OK?", and "The change has been accepted." are predicted to be "responding utterances". In this case, the utterance content extract unit 18 uses the responding utterance content extraction model to extract unit classify "change response" from these utterances as the "response" that is the utterance focus point information.

The dialogue utterance focus point information store 19 stores dialogue utterance data. The data structure of the dialogue utterance data includes the utterance data indicating the utterances of the end-of-talk unit, the dialogue scene data indicating the dialogue scene of the utterances, the utterance type of the utterances, and the utterance focus point information of the utterances. Specifically, as shown in FIG. 6, the data structure stores utterance data of the speech recognition unit, an utterance channel, a speech recognition utterance ID, an end-of-talk unit ID, dialogue scene data, an utterance type, and utterance focus point information. The utterance channel indicates which speaker of a plurality of speakers uttered the content of the utterance. The speech recognition utterance ID is an identifier for identifying the utterance of the unit recognized by the speech recognition processor 10. The end-of-talk unit ID is an identifier for identifying the utterance of the end-of-talk unit predicted by the end-of-talk predict unit 12. When the utterance of the end-of-talk unit includes a plurality of utterances of speech recognition units, the utterances of each speech recognition unit, included in the utterances of the same end-of-talk unit, are stored in association with the same end-of-talk unit ID.

When the dialogue scene of the utterance is predicted by the dialogue scene predict unit 14, the dialogue utterance focus point information store 19 stores the dialogue scene data in association with the utterance data of the end-of-talk unit. Further, when the utterance type of the utterance is predicted by the utterance type predict unit 16, the dialogue utterance focus point information store 19 stores the utterance type in association with the utterance data of the end-of-talk unit. Further, when the utterance focus point information of the utterance is extracted or classified by the utterance content extract unit 18, the dialogue utterance focus point information store 19 stores the extracted or classified utterance focus point information in association with the utterance data of the end-of-talk unit. For example, the dialogue utterance focus point information store 19 may store the utterance focus point information in association with the utterance data of the end-of-talk unit by storing the dialogue scene data, the utterance type, and the utterance focus point information in association with the utterance data indicating the last utterance among a plurality of the utterances of the speech recognition units included in the utterances of the end-of-talk unit.

Further, the dialogue scene, the utterance type, and the utterance focus point information stored in the dialogue utterance focus point information store 19 may be modified, added, or deleted by operations of the service person received by the input/output interface 20. The dialogue utterance focus point information store 19 may store the voice data, which is subject to the speech recognition performed by the speech recognition processor 10, in association with the utterance data.

The input/output interface 20 displays, on a dialogue utterance browser, the dialogue history including the dialogue scene data, the utterance type data, the utterance focus point information, and the utterance data, stored in the dialogue utterance focus point information store 19. The dialogue utterance browser is a window for showing the dialogue history or the like to be displayed on a display device such as a display that is connected to the device for supporting creation of dialogue history 1 via a communication line.

Specifically, the input/output interface 20 displays any one or more of the utterance, the utterance type, and the utterance focus point information for each of the dialogue scenes on the display device. More specifically, when the dialogue scene is predicted by the dialogue scene predict unit 14 and the dialogue scene data is stored in the dialogue utterance focus point information store 19, the input/output interface 20 displays display blocks for the dialogue scenes in the dialogue utterance browser. The display block for a dialogue scene is a field in the dialogue utterance browser that displays information about the dialogue scene.

For example, when the dialogue scene predicted by the dialogue scene predict unit 14 is a new dialogue scene that is different from the previously predicted dialogue scene, the input/output interface 20 displays a display block for the new dialogue scene in the dialogue utterance browser and adds the utterance data corresponding to the dialogue scene in the display block in a non-display manner. When the dialogue scene predicted by the dialogue scene predict unit 14 is the same as the previously predicted dialogue scene, the input/output interface 20 adds the utterance data of the end-of-talk unit corresponding to the dialogue scene in the display block, which has been already displayed in the dialogue voice browser, in a non-display manner. Further, when an utterance is added to the dialogue scene, whether to display or not to display the utterance data can be switched by a setting, and the input/output interface 20 displays or does not display the utterance data each time the utterance data of the end-of-talk unit is extracted in the display block for each dialogue scene based on the setting. Further, the input/output interface 20 displays the utterance focus point information extracted or classified from any of the utterance types corresponding to the dialogue scene in the display block for the dialogue scene. For example, when the utterance type is predicted by the utterance type predict unit 16 and the utterance focus point information is extracted or classified from the utterance predicted to be corresponding to the utterance type by the utterance content extract unit 18, the input/output interface 20 displays the utterance focus point information extracted or classified from the utterance predicted to be the utterance type corresponding to the dialogue scene in the display block.

For example, the display device that is the device for supporting creation of dialogue history 1 displays dialogue information indicating the content of the dialogue and information extracted from the dialogue information. The input/output interface 20 provides and displays a predetermined display block for each of the dialogue scenes, and displays, in the display block for each of the dialogue scenes, the dialogue scene, the utterance type set in advance corresponding to the dialogue scene, and the utterance focus point information corresponding to the utterance type. In the example shown in FIGS. 7 to 12, the utterance types are "topic", "regard", "name", "address", "contact information", and "response". The input/output interface 20 displays an utterance corresponding to the dialogue scene in association with the dialogue scene or the utterance type in the display block for each dialogue scene name.

Further, the device for supporting creation of dialogue history 1 may be an editing device comprising a display device and a dialogue utterance focus point information store 19. The editing device comprises a display device and a dialogue utterance focus point information store that enables any one or more of a modification, deletion, or additional operation of the dialogue scene of the utterance, a modification, deletion, or additional operation of the utterance type, a modification, deletion, or additional operation of the utterance focus point information corresponding to the utterance type, for the utterance corresponding to the dialogue scene.

Figure 7:
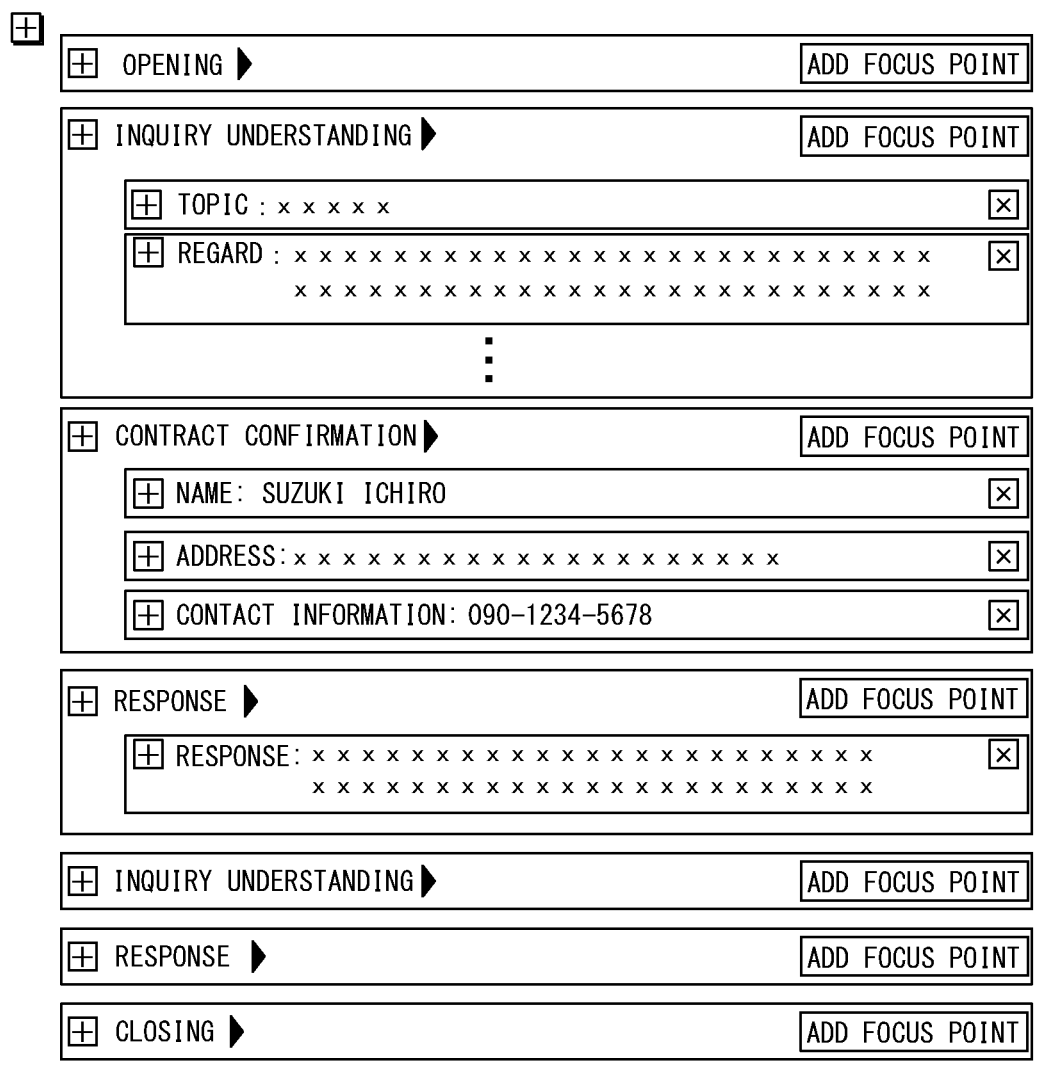
FIG. 7 is a diagram showing a first example of information displayed by the input/output interface in an dialogue utterance browser.

In the example shown in FIG. 7, the input/output interface 20 displays the extracted or classified utterance focus point information corresponding to the utterance type "topic" or "regard" in the display block for the dialogue scene "inquiry understanding", and displays the utterance focus point information extracted or classified corresponding to the utterance type "name", "address", or "contact information" in the display block for the dialogue scene "contract confirmation". The utterance type in the dialogue scene may be displayed even when the corresponding utterance focus point information has not been extracted or classified. For example, when the utterance corresponding to the dialogue scene is not stored in the dialogue utterance focus point information store 19, the input/output interface 20 may display the utterance type in the display block for the dialogue scene, and may display the display field of the utterance and utterance focus point information corresponding to the utterance type as a blank.

Further, the input/output interface 20 receives an operation by the service person, and displays the dialogue scene data, the utterance type, the utterance focus point information, and the utterance data in the dialogue utterance browser based on the operation. Further, when the input/output interface 20 receives an operation performed by the service person, the dialogue utterance focus point information store 19 may add, delete, or modify the stored information based on the operation.

Specifically, the dialogue utterance focus point information store 19 may delete a part of the displayed information based on an operation by the service person. For example, when the service person clicks the "x" button shown in FIG. 7, the dialogue utterance focus point information store 19 may delete the utterance, the topic utterance, or the utterance focus point information displayed adjacent to the clicked "x" button. Consequently, the input/output interface 20 does not display the utterance, the topic utterance, or the utterance focus point information displayed adjacent to the clicked "x" button.

Figure 8:
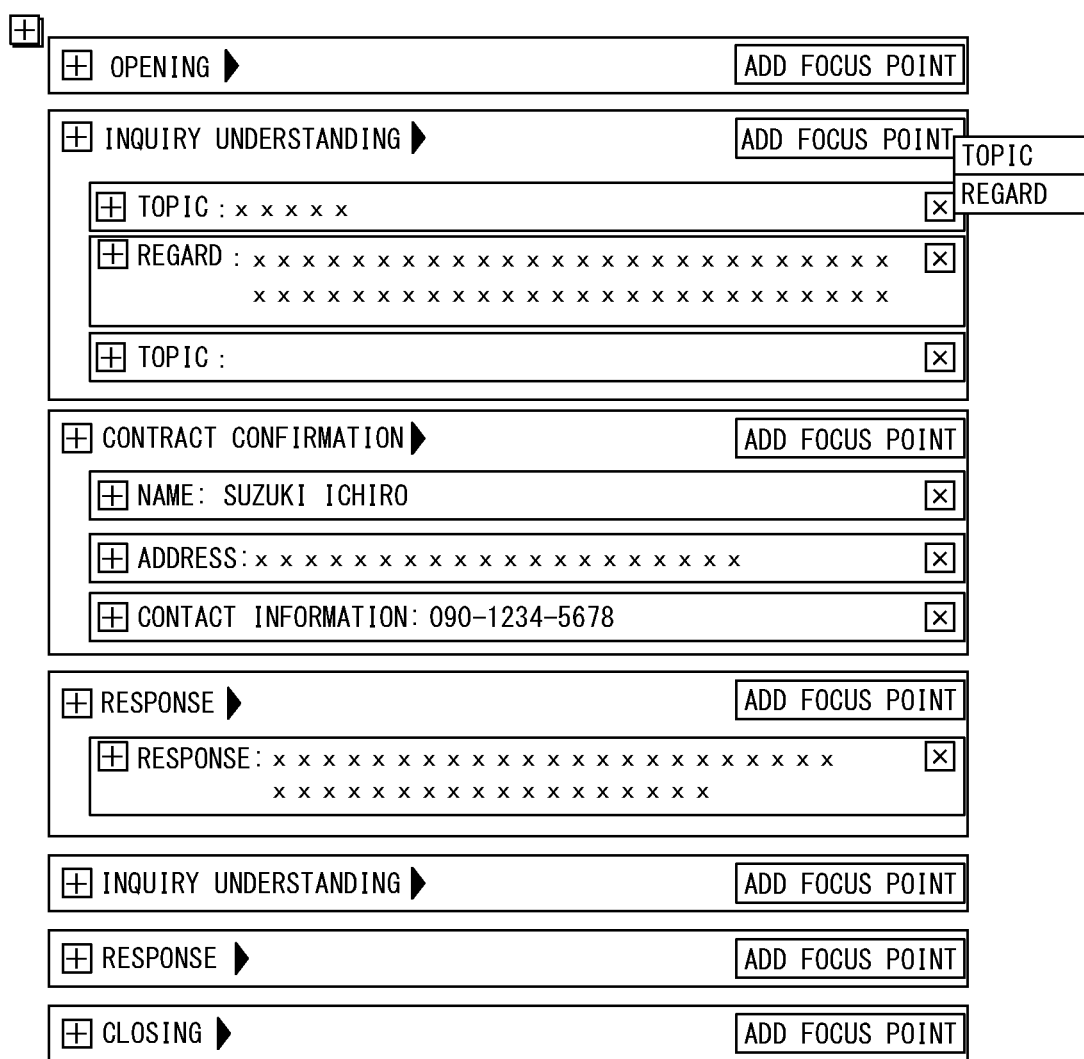
FIG. 8 is a diagram showing a second example of information displayed by the input/output interface in the dialogue utterance browser.

Further, the input/output interface 20 may add and display utterance focus point information included in the dialogue scene based on an operation of the service person. For example, when the service person clicks the "add focus point" button shown in FIG. 7, the input/output interface 20 displays the "topic" button and the "regard" button for selecting the utterance type corresponding to the utterance focus point information to be added, superimposed on the "add focus point" button as shown in FIG. 8. When the service person selects any one of the buttons displayed superimposed on the "add focus point" button, the input field of the utterance focus point information corresponding to the utterance type indicated by the selected button is displayed. In the example shown in FIG. 8, when the service person selects the "topic" button among the buttons for selecting the utterance type that is displayed superimposed on the "add focus point" button in the display block for the dialogue scene "inquiry understanding", the input/output interface 20 displays a new input field of the "topic" at the bottom of the display block for the dialogue scene "inquiry understanding". Further, when the service person inputs the contents of the "topic", the input/output interface 20 receives the contents of the input "topic", and the dialogue utterance focus point information store 19 stores the contents in association with the dialogue scene data. At this time, when the service person clicks the utterance, the dialogue utterance focus point information store 19 stores the correspondence that the utterance is a "topic utterance" and the correspondence between the content of the input "topic" and the clicked utterance. Further, when the utterance focus point information is added based on the operation of the service person, the utterance content extraction model stored in the utterance content extraction model store 17 is updated based on supervision data including the correspondence between the utterance and the added utterance type and the utterance focus point information.

Figure 9:
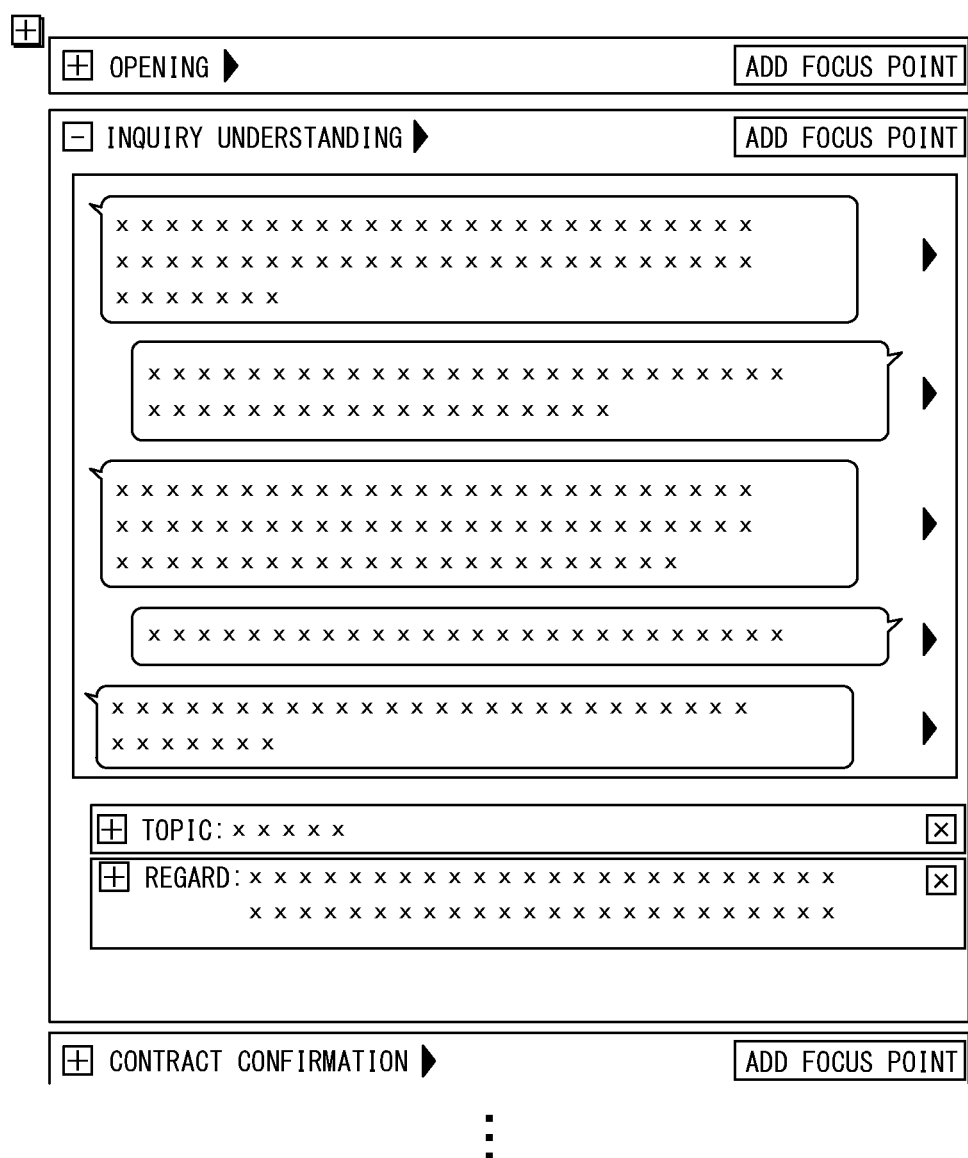
FIG. 9 is a diagram showing a third example of information displayed by the input/output interface in the dialogue utterance browser.

The input/output interface 20 may display the contents of the utterances for each of the dialogue scenes based on an operation of the service person. For example, when the service person clicks the "+" button adjacent to the dialogue scene shown in FIG. 7, the input/output interface 28 displays the utterance data corresponding to the dialogue scene adjacent to the "+" button clicked as shown in FIG. 9. At this time, the input and output interface 20 may display the utterances of the end-of-talk unit surrounded by a balloon. Further, when the utterance data is displayed, the input/output interface 20 displays the "−" button instead of the "+" button adjacent to the dialogue scene corresponding to the utterance data. When the service person clicks the "−" button, the input/output interface 20 does not display the utterance.

Further, the input/output interface 20 may output a voice indicating an utterance based on an operation of the service person. For example, when the service person clicks the triangular button shown in FIG. 9, the input/output interface 20 outputs, by voice, the voice data stored in the dialogue utterance focus point information store 19 corresponding to the utterance displayed adjacent to the clicked triangular button.

Figure 10:
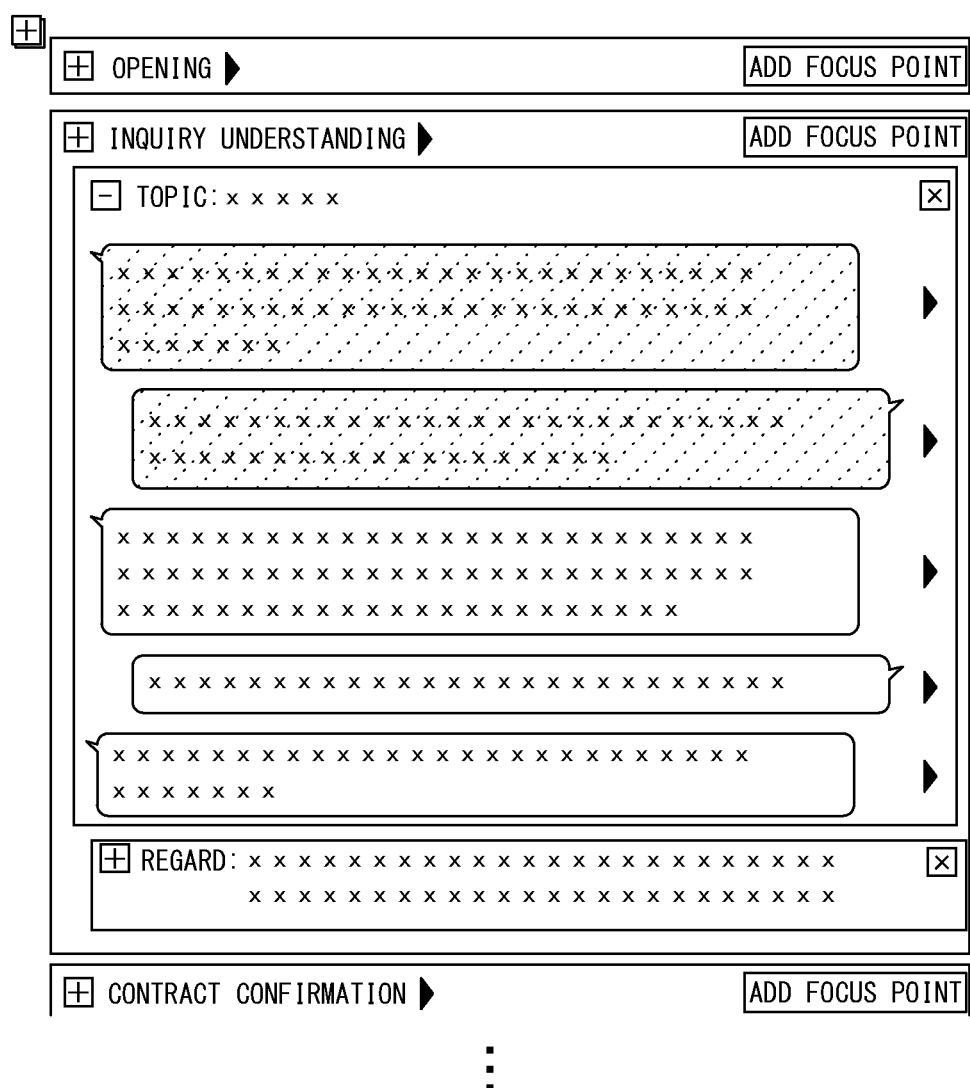
FIG. 10 is a diagram showing a fourth example of information displayed by the input/output interface in the dialogue utterance browser.

Further, the input/output interface 20 may display an utterance predicted as an utterance type in a display style different from that of other utterances. For example, when the service person clicks the "+" button adjacent to the "topic" which is the utterance focus point information displayed in the display block for the dialogue scene "inquiry understanding" shown in FIG. 7, the input/output interface 20 displays the utterance data of the dialogue scene "inquiry understanding" corresponding to the "topic", as shown in FIG. 10. At this time, the input/output interface 20 assigns and displays a background color that is different from that of the utterances that are not the above-mentioned utterance (predetermined background color), such as the one shown by the dashed diagonal lines in FIG. 10, to the utterance data that is predicted to be the topic utterance as the utterance type among the displayed utterance data.

As described above, an utterance from which the topic is extracted or classified is an utterance predicted to be a "topic utterance" by the utterance type predict unit 16. For example, a predetermined background color may be added to the utterance data that the service person recognizes as not being a topic utterance, due to the prediction by the utterance type predict unit 16 being incorrect. In this case, the service person can perform an operation to remove the predetermined background color added to the utterance data recognized as not being a topic utterance. For example, when the service person clicks (first click) an utterance with a predetermined background color, the input/output interface 20 displays the utterance without assigning any predetermined background color. The first click is a click in a predetermined format, and it is, for example, any one of a left-click, a right-click, or a double-click.

Further, when the predetermined background color is unassigned based on an operation of the service person, the dialogue utterance focus point information store 19 may delete the utterance type stored corresponding to the utterance data in which the predetermined background color is unassigned by the operation of the service person. Further, when the predetermined background color is unassigned based on an operation of the service person, the utterance type prediction model stored in the utterance type prediction model store 15 is updated based on supervision data indicating that the utterance does not correspond to the utterance type of the utterance.

Further, a predetermined background color may not be assigned to utterance data that the service person recognizes as being topic utterance, due to the prediction by the utterance type predict unit 16 being incorrect. In this case, the service person can perform an operation for assigning the predetermined background color to the utterance data that is recognized as being a topic utterance. For example, when the service person clicks an utterance to which a predetermined background color is not assigned, the input/output interface 20 assigns and displays a predetermined background color to the utterance.

When a predetermined background color is assigned based on an operation of the service person, the dialogue utterance focus point information store 19 may add the utterance type in association with the utterance data to which the predetermined background color is assigned by the operation of the service person. Further, when the predetermined background color is assigned based on the operation of the service person, the utterance type prediction model stored in the utterance type prediction model store 15 is updated based on the supervision data indicating that the utterance corresponds to the utterance type of the utterance.

Figure 11:
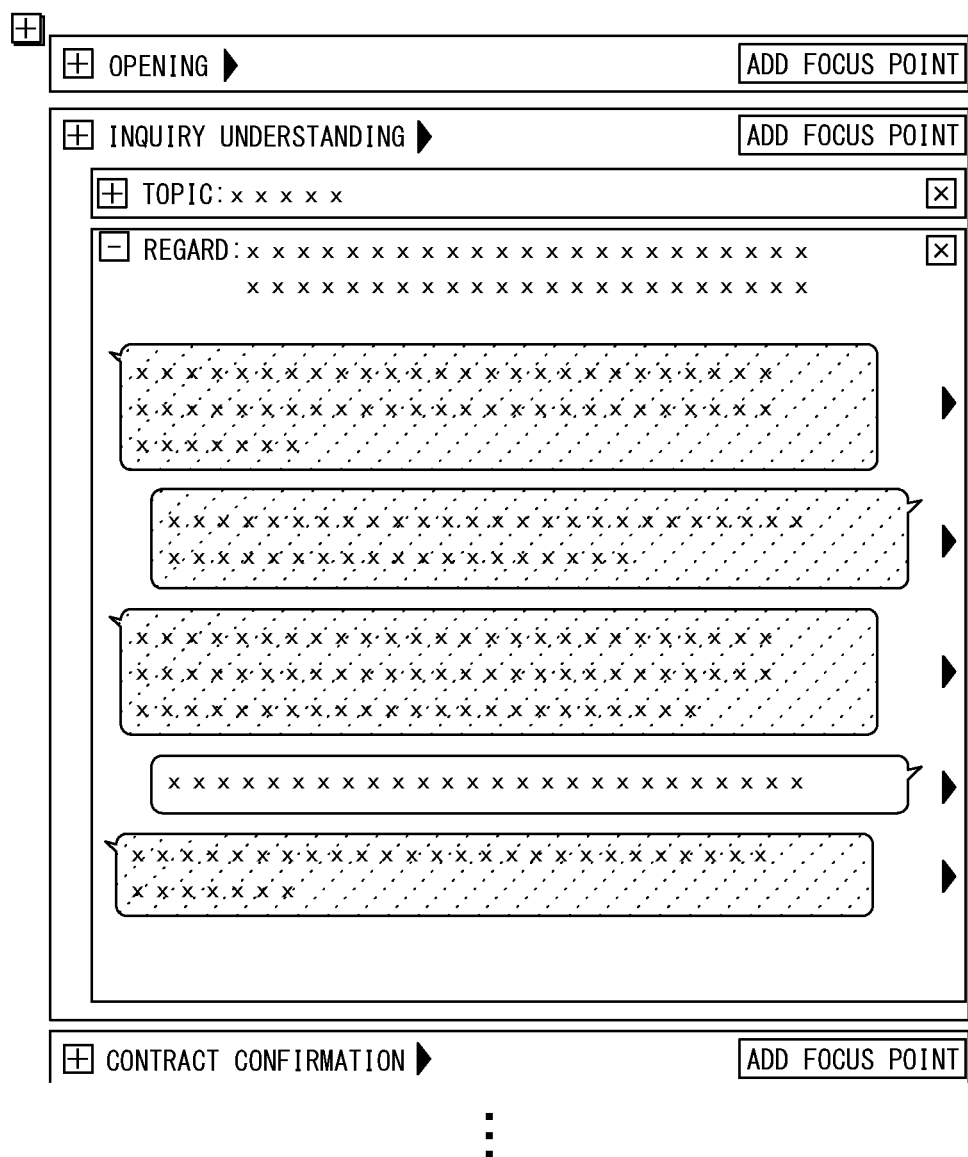
FIG. 11 is a diagram showing a fifth example of information displayed by the input/output interface in the dialogue utterance browser.

Further, for example, when the service person clicks the "+" button adjacent to "regard" which is the utterance focus point information displayed in the display block for the dialogue scene "inquiry understanding" shown in FIG. 7, the input/output interface 20 assigns and displays the predetermined background color to the utterance data indicating the utterance from which the regard is extracted or classified in the dialogue scene "inquiry understanding". Specifically, when the service person clicks the "+" button adjacent to "regard" shown in FIG. 7, the input/output interface 20 displays the utterance data of the dialogue scene "inquiry understanding" corresponding to "regard", for example, as shown in FIG. 11. At this time, the input/output interface 20 assigns and displays a background color that is different from that of other utterances (predetermined background color), such as the one shown by the dashed diagonal lines in FIG. 11, to the utterance data among the displayed utterance data, from which "regard" is extracted or classified as the utterance focus point information.

As described above, the utterance in which "regard" is extracted or classified as the utterance focus point information is the utterance for which the utterance type is predicted to be "regard utterance" or "regard confirmation utterance" by the utterance type predict unit 16. For example, a predetermined background color may be assigned to the utterance that the service person recognizes as being neither a regard utterance nor a regard confirmation utterance, due to the prediction by the utterance type predict unit 16 being incorrect. In this case, the input/output interface 20 can perform an operation for removing the predetermined background color assigned to the utterance recognized by the service person as being neither a "regard utterance" nor a "regard confirmation utterance", based on the operation of the service person. For example, when the service person clicks an utterance to which a predetermined background color is assigned, the input/output interface 20 displays the utterance without assigning a predetermined background color.

Further, when the predetermined background color is unassigned based on an operation of the service person, the dialogue utterance focus point information store 19 may the utterance type stored corresponding to the utterance data from which the predetermined background color is unassigned by the operation of the service person. Further, when the predetermined background color is unassigned based on the operation of the service person, the utterance type prediction model stored in the utterance type prediction model store 15 is updated based on supervision data indicating that the utterance does not correspond to the utterance type of the utterance.

Further, a predetermined background color may not be assigned to an utterance that the service person recognizes as being a regard utterance or a regard confirmation utterance, due to the prediction by the utterance type predict unit 16 being incorrect. In this case, the input/output interface 20 can perform an operation for assigning a predetermined background color to the utterance recognized by the service person as being a "regard utterance" or "regard confirmation utterance" based on an operation of the service person. For example, when the service person clicks an utterance to which a predetermined background color is not assigned, the input/output interface 20 assigns and displays a predetermined background color to the utterance.

Further, when a predetermined background color is assigned based on an operation of the service person, the dialogue utterance focus point information store 19 may add an utterance type to be stored corresponding to the utterance data to which the predetermined background color is assigned by the operation of the service person. Further, when the predetermined background color is assigned based on the operation of the service person, the utterance type prediction model stored in the utterance type prediction model store 15 is updated based on supervision data indicating that the utterance corresponds to the utterance type of the utterance.

Figure 12:
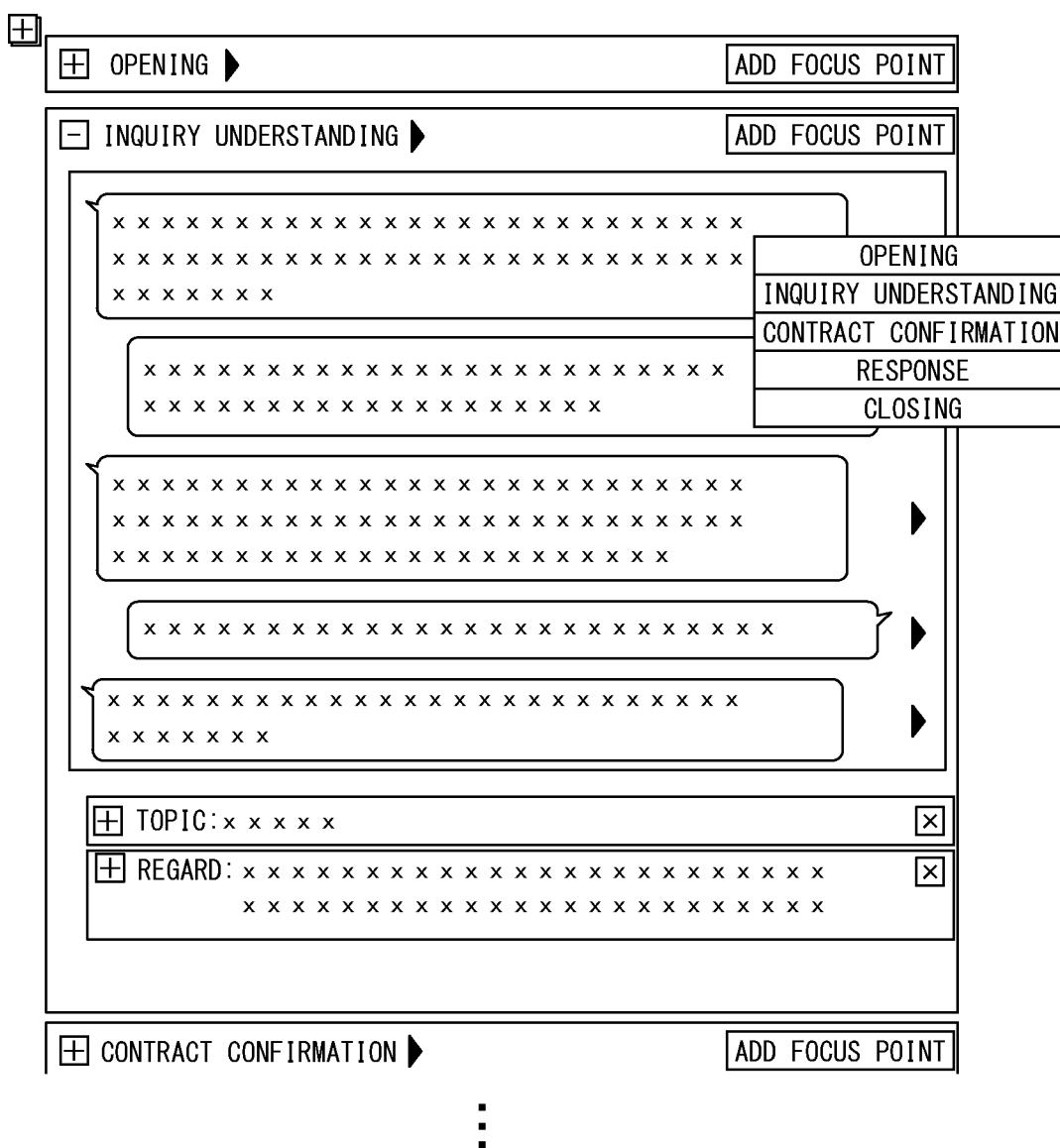
FIG. 12 is a diagram showing a sixth example of information displayed by the input/output interface in the dialogue utterance browser.

As described above, when the dialogue scene of each utterance is predicted by the dialogue scene predict unit 14, the input/output interface 20 displays the utterance data corresponding to the display block for each of the dialogue scenes. However, the prediction of the dialogue scene by the dialogue scene predict unit 14 may be incorrect. As a result, the utterance data may be displayed in the display block for a dialogue scene which is different from the dialogue scene recognized by the service person. In this case, the input/output interface 20 can display the utterance data in the display block for the dialogue scene recognized by the service person based on an operation of the service person. For example, as shown in FIG. 12, when the service person clicks (the second click) the utterance data, the input/output interface 20 displays a list of dialogue scenes superimposed on the utterance. The second click is a predetermined click in a format that is different from that of the first click. Then, when the service person selects any one of the dialogue scenes, the input/output interface 20 displays the utterance data in the display block for the selected dialogue scene.

When the dialogue scene of an utterance is modified based on an operation of the service person, the dialogue utterance focus point information store 19 modifies the dialogue scene data stored corresponding to the utterance data to the dialogue scene data indicating the dialogue scene selected by the service person and stores it. At this time, the utterance type and the focus points corresponding to the utterance data, which have been already stored in the dialogue utterance focus point information store 19 corresponding to the utterance data, may be deleted. Further, when the dialogue scene of the utterance is modified based on the operation of the service person, the dialogue scene prediction model stored in the dialogue scene prediction model store 13 is updated based on supervision data including the correspondence between the utterance and the modified dialogue scene. Further, when the dialogue scene prediction model is updated, the dialogue scene predict unit 14 may again predict the dialogue scene of the utterance by using the updated dialogue scene prediction model, and the utterance type predict unit 16 may again predict the utterance type of the utterance by using the predicted dialogue scene.

In the example shown in FIG. 12, it is assumed that the service person clicks the first utterance data displayed in the display block for the dialogue scene "inquiry understanding" and selects "opening" from the displayed dialogue scenes. In this case, the input/output interface 20 displays the utterance data that is clicked by the service person, in the display block for the dialogue scene "opening" instead of the display block for the dialogue scene "inquiry understanding".

Further, for example, it is assumed that the service person clicks the first utterance data displayed in the display block for the dialogue scene "inquiry understanding" and selects "contract confirmation" from the displayed dialogue scenes. In this case, the input/output interface 20 newly displays the display block for the dialogue scene "contract confirmation" on the display block for "inquiry understanding"", and displays the clicked utterance data in the display block.

Further, for example, it is assumed that the service person clicks the third utterance data from the top, displayed in the display block for the dialogue scene "inquiry understanding" and selects "response" from the displayed dialogue scenes. In this case, the input/output interface 20 continuously displays the utterance data of the above two utterances data that has been displayed in the display block for the "inquiry understanding", in the display block for the "inquiry understanding". Further, the input/output interface 20 newly displays a display block for "response" below the display block for "inquiry understanding", and displays the utterance data clicked in the display block. Further, the input/output interface 20 displays the display block for "inquiry understanding" in the newly displayed display block for "response", and displays the utterance data displayed below the utterance data clicked in the display block.

Further, as described above, when the "responding utterance" is not finely extracted, the utterance type predict unit 16 may predict the utterance type of all utterances, whose dialogue scene is predicted to be "response" by the dialogue scene predict unit 14, as "responding utterances". In this case, the utterance content extract unit 18 extracts or classifies the utterance focus point information from all utterances for which the dialogue scene is predicted to be "response". For example, the utterance content extract unit 18 may extract all utterances other than surplus words through a filter that deletes the surplus words from the utterance for which the dialogue scene is predicted to be "response". Surplus words are words that are not necessary for acquiring the content of predetermined utterances, and includes, for example, "yes" and "er".

Therefore, as shown in FIG. 13, the input/output interface 20 assigns a predetermined background color indicating that utterance focus point information, as extracted or classified utterances, are responding utterances for any of the utterance data that indicates utterances corresponding to the dialogue scene "response". Further, when the utterance type is not predicted, the input/output interface 20 may display all of the utterance data indicating the utterance of the dialogue scene as the utterance focus point information in the display block for the dialogue scene, or may delete only surplus words as described above. Further, all of the utterance data displayed as the utterance focus point information in the dialogue scene can be added, modified, or deleted by operations of the service person. The dialogue utterance focus point information store 19 can store utterances as utterance focus point information added or modified by the operation of the service person, and not store utterances as deleted utterance focus point information. Because the service person only needs to add, modify, or modify a part in this way, the operations of the service person for inputting the dialogue history are reduced, and the dialogue history is efficiently created.

Figure 14:
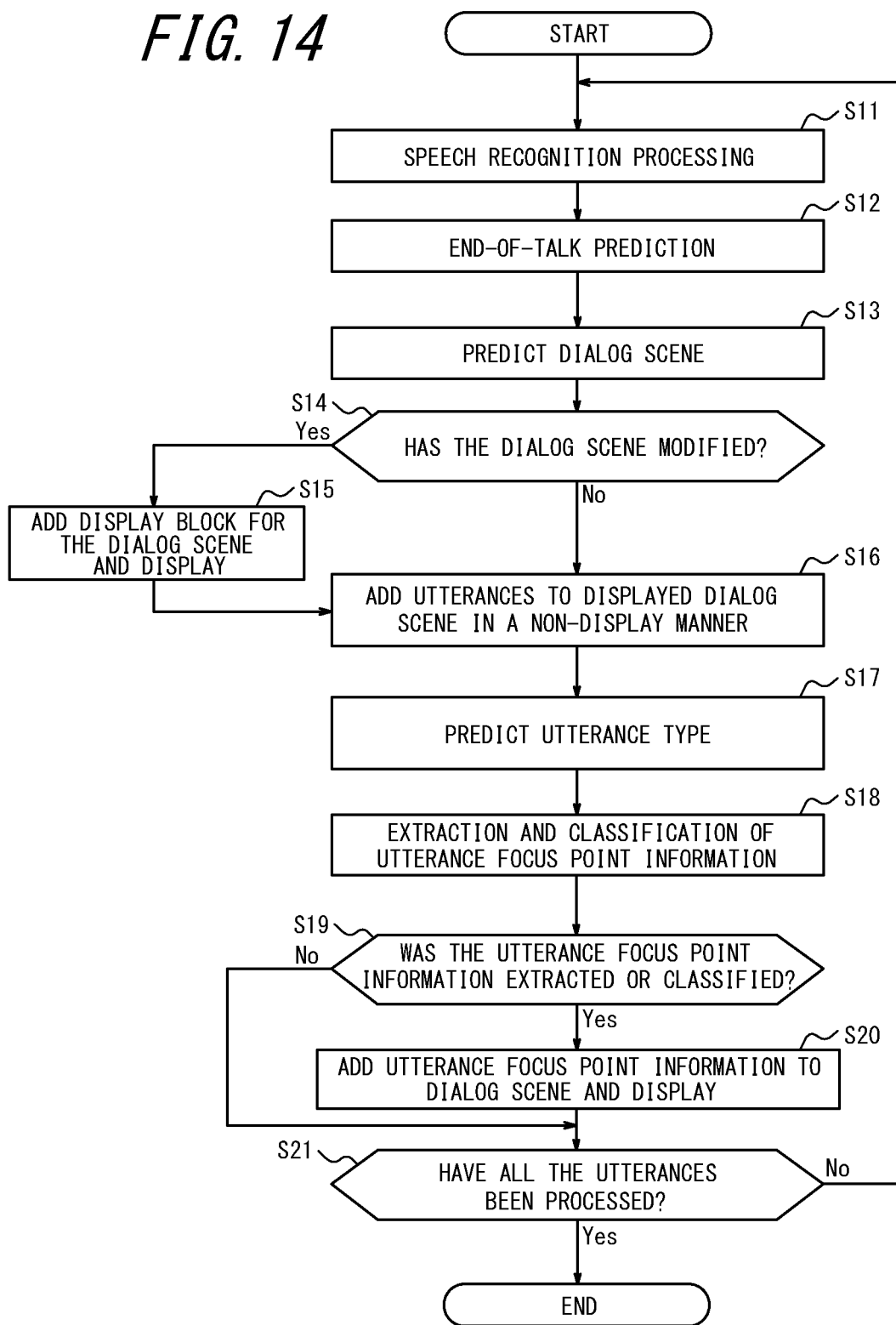
FIG. 14 is a flowchart showing an example of a method for supporting creation of dialogue history executed by the device for supporting creation of dialogue history shown in FIG. 1.

Next, a method for supporting creation of dialogue history executed by the device for supporting creation of dialogue history 1 according to the present embodiment will be described with reference to a flowchart shown in FIG. 14. FIG. 14 is a flowchart showing an example of the method for supporting creation of dialogue history executed by the device for supporting creation of dialogue history 1.

First, the speech recognition processor 10 acquires the utterances of a speaker by voice, performs speech recognition processing on the voice and converts it into the utterances of a speech recognition unit indicated by character information (Step S11).

The end-of-talk predict unit 12 predicts an end-of-talk in the utterances of the speech recognition unit converted by the speech recognition processor 10. The end-of-talk predict unit 12 acquires the utterances of the end-of-talk unit as one unit from initiation to termination of the utterances (Step S12).

The dialogue scene predict unit 14 predicts the dialogue scene for each utterance of the end-of-talk unit (step S13).

The dialogue scene predict unit 14 predicts whether the dialogue scene predicted in step S13 has modified from a dialogue scene that has already been predicted (step S14).

When it is predicted in step S14 that the dialogue scene has modified, the input/output interface 20 adds the display block for the dialogue scene predicted in step S13 to the dialogue utterance browser and displays it (step S15).

When it is predicted in step S14 that the dialogue scene has not modified, or when the display block for the dialogue scene is additionally displayed in step S15, the input/output interface 20 adds the utterance data indicating the utterance corresponding to the dialogue scene to the display block for the dialogue scene in a non-display manner (step S16).

The utterance type predict unit 16 predicts the utterance type for each end-of-talk unit (step S17). The utterance type predict unit 16 may predict the utterance type by utilizing the dialogue scene predicted in step S13.

The utterance content extract unit 18 extracts or classifies the utterance focus point information from the utterance based on the utterance type predicted by the utterance type predict unit 16 (Step S18).

Next, the utterance content extract unit 18 predicts whether the utterance has been extracted or classified in Step S18 (Step S19).

When it is predicted in step S19 that the utterance focus point information has been extracted or classified, the input/output interface 20 adds the utterance focus point information to the display block for the dialogue scene displayed in the dialogue utterance browser and displays it (step S20).

The utterance content extract unit 18 predicts whether the process for extracting or classifying the utterance focus point information for all utterances has been completed (step S21).

When it is predicted in step S21 that the process for extracting or classifying the utterance focus point information for all utterances of the end-of-talk unit has been completed, the device for supporting creation of dialogue history 1 ends the process. When it is predicted that the process for extracting or classifying the utterance focus point information for all utterances has not been completed, the device for supporting creation of dialogue history 1 returns to step S11 and repeats the process.

As described above, in the present embodiment, the device for supporting creation of dialogue history 1 predicts the dialogue scene of the utterance and predicts the utterance type of the utterance by using the predicted dialogue scene. Further, the device for supporting creation of dialogue history 1 extracts or classifies the utterance focus point information from the utterance predicted as the utterance type, and displays the utterance focus point information in the block for the dialogue scene of the utterance. Thus, as the dialogue to the customer progresses, the service person can refer to the utterance focus point information displayed in the dialogue utterance browser in real time. Therefore, the service person can appropriately respond to the customer while confirming the flow of a large utterance story in his or her own service.

Further, in the present embodiment, when the dialogue scene is predicted, the device for supporting creation of dialogue history 1 displays the display block for the dialogue scene on the display device, and displays the utterance type and the utterance focus point information in the display block. Thus, the service person can refer to the utterance focus point information compactly displayed for each of the dialogue scenes in real time, each time the dialogue scene modifies as the dialogue to the customer progresses. Therefore, because the service person can quickly confirm the flow of the large utterance story in the content of his or her own service for each of the dialogue scenes, the service person can appropriately respond to the customer.

Further, in the present embodiment, when the dialogue scene of the utterance is predicted, the device for supporting creation of dialogue history 1 adds the utterance data to the display block for the dialogue scene in a non-display manner, and displays the utterance data based on the operation of the service person. Thus, the service person can look at an overview of the entire dialogue in the dialogue utterance browser, and can refer to the utterance data when it is necessary to confirm the details for the desired dialogue scene. Therefore, the service person can appropriately acquire the information necessary for himself/herself.

Further, in the present embodiment, the device for supporting creation of dialogue history 1 stores the utterance data, the dialogue scene data of the utterance, the utterance type of the utterance, and the utterance focus point information in association with each other. Then, the device for supporting creation of dialogue history 1 receives an operation, and adds, modifies, or deletes the dialogue scene data, the utterance type, or the utterance focus point information based on the operation. As described above, the dialogue scene is predicted by using a dialogue scene prediction model generated by learning. Next, the utterance type is predicted by using the utterance type prediction model or a rule generated by learning. Further, the utterance focus point information is extracted or classified by using the utterance content extraction model or a rule generated by learning. Thus, the predicted dialogue scene and utterance type, and extracted or classified utterance focus point information may differ from the dialogue scene, the utterance type, or the utterance focus point information recognized by the service person. Therefore, by adding, modifying, or deleting the dialogue scene data, the utterance type, and the utterance focus point information, for example, based on operations of the service person, the device for supporting creation of dialogue history 1 improves the accuracy of the dialogue scene data, the utterance type, and the utterance focus point information stored corresponding to the utterance data indicating each utterance. Further, because the dialogue scene prediction model, the utterance type prediction model, and the utterance content extraction model are updated based on the supervision data indicating the correspondence between the utterance data, and the dialogue scene data, the utterance type and the utterance focus point information that are added, modified, or deleted, every time the device for supporting creation of dialogue history 1 is used repeatedly, the accuracy of the dialogue scene prediction, the utterance type prediction, and the extraction and classification of the utterance content extraction can be improved.

In the past, in order to create a dialogue history, the service person has selected a menu from a pull-down for regard or response on the operation form of the service person, or filled out a summary in the free entry field. Because the selection itself is a small amount of work to select the pull-down menu, the dialogue can be classified in a unified manner regardless of the service person, but the information as the dialogue history is little. On the other hand, for filling out a free entry field, the necessary utterance focus point information can be stored because a summary prepared by the service person can be filled out, but the granularity of the description varies depending on the service person. In this embodiment, in order to display the dialogue history as described above, the pull-down menu selection and the free entry may be combined. Further, the pull-down menu can be automatically selected based on the dialogue record data stored in the dialogue utterance focus point information store 19, or candidates for selection can be automatically narrowed down. For filling out the free entry field, the service person can also create the dialogue history by posting the content displayed on the dialogue utterance browser by the input/output interface 20.

Further, as described above, because the device for supporting creation of dialogue history 1 according to the present embodiment displays detailed information together with the dialogue scene, the utterance type, and the utterance focus point information, while maintaining the amount of information, the service person can easily acquire the whole picture of the content of the dialogue and the flow of the conversation, compared to the conventional method of listening to the utterance from a recording device that records voice during the dialogue and the method of viewing the textualized utterance by the speech recognition result. Therefore, the service person can acquire the content of the dialogue in a short time.

Although not specifically described in the embodiment, a program for executing each process performed by a computer that functions as the device for supporting creation of dialogue history 1 may be provided. Further, the program may also be stored on a computer readable medium. The computer readable medium may be used to install the program on the computer. Here, the computer readable medium in which the program is stored may be a non-transient storage medium. The non-transient storage medium may be, but is not limited to, a storage medium such as a CD-ROM or a DVD-ROM.

Figure 15:
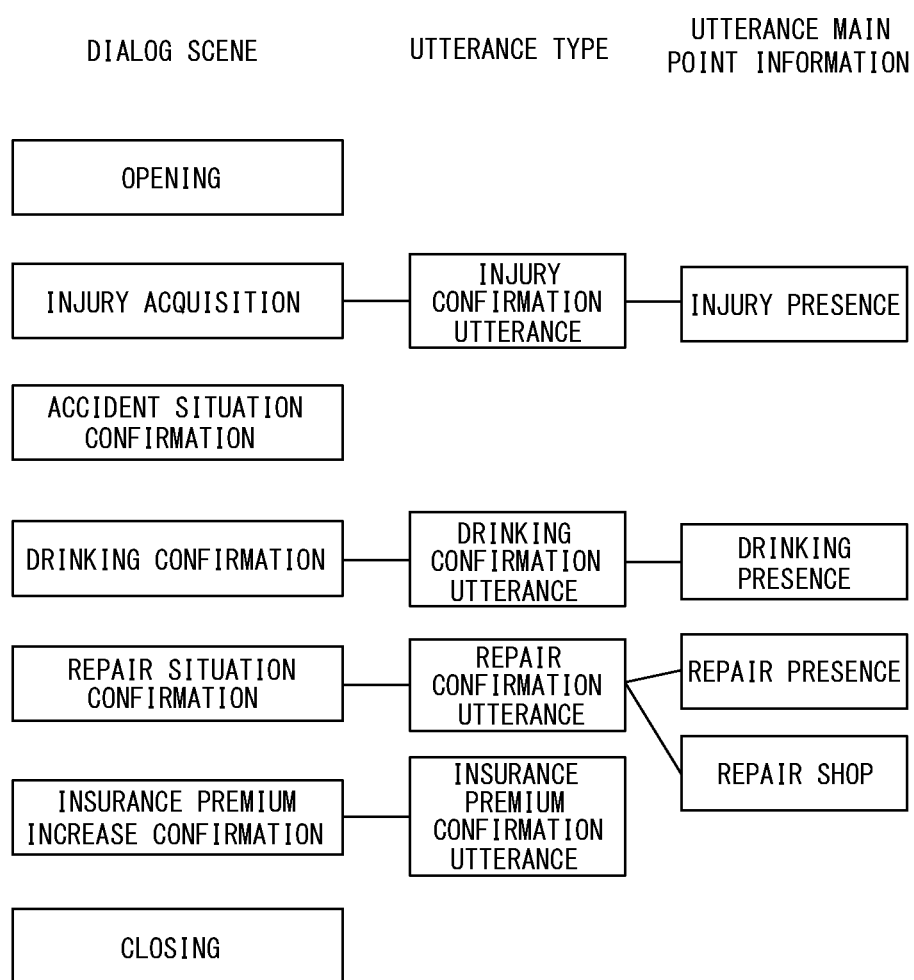
FIG. 15 is a diagram showing a correspondence between utterances of the speech recognition unit, utterances of the end-of-talk unit, dialogue scenes, utterance types, and utterance focus point information in a modified example.

In addition, the device for supporting creation of dialogue history 1 according to the present embodiment can correspond to another type of dialogue. For example, when a customer has a car accident, a call center operator of a car insurance company confirms with the customer who had the accident, the situation of injury, the situation of the accident, whether the car has already been repaired and the like, and then confirms a ratio of negligence and an application of the car insurance over the telephone with the customer. In this case, the dialogue is not a form in which regard is received from a customer and answered, but as shown in FIG. 15, it is possible to respond by defining dialogue scenes such as "injury acquisition", "accident situation acquisition", "drunk driving", "repair situation confirmation", and "insurance premium increase confirmation". In this case, the dialogue scene predict unit 14 may predict dialogue scenes such as "injury acquisition", "accident situation acquisition", "drunk driving", "repair situation confirmation", "insurance premium increase confirmation" and the like by using a model for predicting each dialogue scene.

In this case, the utterance type predict unit 16 may predict whether the utterance type of the utterance whose dialogue scene is predicted to be "injury acquisition" is "injury confirmation utterance", predict whether the utterance type of the utterance whose dialogue scene is predicted to be "drinking confirmation" is "drinking confirmation utterance", predict whether the utterance type of the utterance whose dialogue scene is predicted to be "repair situation confirmation", is "repair confirmation utterance" and predict whether the utterance type of the utterance whose dialogue scene is predicted to be "insurance premium increase confirmation" is "insurance premium confirmation utterance".

Further, the utterance content extract unit 18 may extract unit classify the utterance focus point information of "injury presence" or "injured part" from the utterance for which the utterance type is predicted to be "injury confirmation utterance", extract unit classify the utterance focus point information of "drinking presence" from the utterance for which the utterance type is predicted to be "drinking confirmation utterance", and extract unit classify the utterance focus point information of the "repair presence" and "repair shop", respectively, from the utterance for which the utterance type is predicted to be "repair confirmation utterance".

Further, in the device for supporting creation of dialogue history 1 according to the present embodiment, in order for the service person to more efficiently acquire the contents of the dialogue, the input/output interface 20 may display the utterance focus point information extracted or classified by the utterance content extract unit 18 in the display block for the corresponding dialogue scene. For example, as shown in FIG. 16, the input/output interface 20 may display "injury presence" as the utterance focus point information extracted or classified by the utterance content extract unit 18 in the display block for the dialogue scene "injury acquisition".

Further, in the present embodiment, the device for supporting creation of dialogue history 1 does not need to comprise the speech recognition processor 10. In this case, the end-of-talk predict unit 12 acquires the utterances of the speech recognition units from a speech recognition processing device that is not shown in the accompanying drawings and is different from the device for supporting creation of dialogue history 1. Further, the end-of-talk predict unit 12 may acquire utterance data composed of input text by a chat function or the like.

Further, in the present embodiment, the device for supporting creation of dialogue history 1 does not need to comprise the end-of-talk prediction model store 11 and the end-of-talk predict unit 12. In this case, the dialogue scene predict unit 14 predicts the dialogue scene of the utterance of the speech recognition unit that is speech-recognized by the speech recognition processor 10 or a speech recognition device that is not shown in the accompanying drawings.

While the above-mentioned embodiments have been described as representative examples, it will be apparent to those who are skilled in the art that many changes and substitutions may be made within the spirit and scope of the present disclosure. Therefore, the present disclosure should not be construed as being limited by the above embodiments, and various changes and modifications may be made without departing from the scope of claims. For example, a plurality of configuration blocks described in the configuration diagram of the embodiment can be combined into one, or a single configuration block can be divided.

As described above, a device according to the present disclosure may be a device for supporting creation of dialogue history, including:

a dialogue utterance focus point information store configured to store, in correspondence with utterance data indicating an utterance, dialogue scene data indicating a dialogue scene of the utterance, an utterance type indicating a type of the utterance, and utterance focus point information of the utterance; and an input/output interface configured to display on a display device one or more of the utterance, the utterance type, and the utterance focus point information for each of the dialogue scene indicated by the dialogue scene data stored in the dialogue utterance focus point information store, wherein, based on an operation input to the input/output interface, the dialogue utterance focus point information store adds, modifies, or deletes one or more of the dialogue scene data, the utterance type, and the utterance focus point information.

The input/output interface may be configured to display a display block for the dialogue scene on the display device when the dialogue scene is added to the dialogue utterance focus point information store, and display the utterance focus point information extracted or classified from any of the utterances corresponding to the dialogue scene in the display block for the dialogue scene.

The input/output interface may be configured to add the utterance data indicating the utterance corresponding to the dialogue scene in the display block for the dialogue scene when the dialogue scene is added to the dialogue utterance focus point information store.

The input/output interface may be configured to add the utterance data indicating the utterance corresponding to the dialogue scene in a non-display manner, and display the added utterance data based on an operation to the input/output interface.

The input/output interface may be configured to display utterance data indicating the utterance from which the utterance focus point information is extracted or classified in a display style different from other utterance data.

The dialogue utterance focus point information store may, in correspondence with the utterance data, store voice data representing an utterance indicated by the utterance data, and the input/output interface may be configured to output the voice data by voice based on the operation.

The device for supporting creation of dialogue history may further include:

a dialogue scene predict unit configured to predict a dialogue scene of un utterance;

an utterance type predict unit configured to predict an utterance type that is a type of the utterance based on the dialogue scene; and an utterance content extract unit configured to extract unit classify utterance focus point information of the utterance based on the utterance type.

The device for supporting creation of dialogue history may further include an end-of-talk predict unit configured to predict an end-of-talk of an utterance recognized by speech recognition processing, and acquire an utterance of an end-of-talk unit as one unit from speech initiation to end-of-talk. The dialogue scene predict unit may predict the dialogue scene of the utterance of the end-of-talk unit.

A method according to the present disclosure may be a method for supporting creation of dialogue history in a device for supporting creation of dialogue history, including:

storing, in correspondence with utterance data indicating an utterance, dialogue scene data indicating a dialogue scene of the utterance, an utterance type indicating a type of the utterance, and utterance focus point information of the utterance;

displaying one or more of the utterance, the utterance type, and the utterance focus point information corresponding to the dialogue scene data for each of the stored dialogue scene on a display device; and adding, modifying, or deleting one or more of the dialogue scene data, the utterance type, and the utterance focus point information, based on an inputted operation.

A data structure according to the present disclosure may be a data structure for dialogue utterance data, that is used in a computer comprising a dialogue utterance focus point information store for supporting the creation of a dialogue history and an input/output interface, and that is stored in the dialogue utterance focus point information store, including:

utterance data indicating an utterance;

dialogue scene data indicating a dialogue scene of the utterance;

utterance focus point information of the utterance; and an utterance type indicating a type of the utterance, wherein:

the dialogue utterance focus point information store stores, in correspondence with the utterance data, the dialogue scene data, the utterance focus point information, and the utterance type, the input/output interface displays one or more of the utterance, the utterance type, and the utterance focus point information for each of the dialogue scene stored in the dialogue utterance focus point information store on a display device, and the dialogue utterance focus point information store is used for a process of adding, modifying, or deleting one or more of the dialogue scene data, the utterance type, and the utterance focus point information based on an operation input to the input/output interface.

A program according to the present disclosure may be configured to cause a computer to function as the device for supporting creation of dialogue history.

The invention claimed is:

1. A display device for displaying an utterance and information extracted from the utterance, comprising an input/output interface configured to:

display display blocks for a series of dialogue scenes in chronological order of acquisition of utterances, each of the series of dialogue scenes being indicated by dialogue scene data stored in correspondence with utterance data indicating a corresponding one of the utterances, wherein the utterances occurred among a plurality of persons including a service person;

display dialogue scene information within each of the display blocks for the series of dialogue scenes, the dialogue scene information including the corresponding one of the utterances, an utterance type indicating a type of the corresponding one of the utterances, or utterance focus point information of the corresponding one of the utterances; and switch, based on an operation input, between displaying the dialogue scene information and not displaying the dialogue scene information within each of the display blocks for the series of dialogue scenes.

2. The display device according to claim 1, wherein the input/output interface is configured to display, as the dialogue scene information, the corresponding one of the utterances and the utterance type in association with each other, within each of the display blocks for the series of dialogue scenes.

3. The display device according to claim 1, wherein each of the series of the dialogue scenes is a scene based on the content of the corresponding one of the utterances, the utterance focus point information is information based on an analysis of the corresponding one of the utterances, and the input/output interface is configured to display, as the dialogue scene information, at least the utterance focus point information.

4. An editing support device, comprising the display device according to claim 1, and a dialogue utterance focus point information store configured to, with respect to an utterance corresponding to a dialogue scene, enable one or more of:
- an operation to modify, delete, or add the dialogue scene of the utterance;
- an operation to modify, delete, or add an utterance type of the utterance; and
- an operation to modify, delete, or add utterance focus point information corresponding to the utterance type.

5. An editing support device, comprising the display device according to claim 2, and a dialogue utterance focus point information store configured to, with respect to an utterance corresponding to a dialogue scene, enable one or more of:
- an operation to modify, delete, or add the dialogue scene of the utterance;
- an operation to modify, delete, or add an utterance type of the utterance; and
- an operation to modify, delete, or add utterance focus point information corresponding to the utterance type.

6. An editing support device, comprising the display device according to claim 3, and a dialogue utterance focus point information store configured to, with respect to an utterance corresponding to a dialogue scene, enable one or more of:
- an operation to modify, delete, or add the dialogue scene of the utterance;
- an operation to modify, delete, or add an utterance type of the utterance; and
- an operation to modify, delete, or add utterance focus point information corresponding to the utterance type.

* * * * *